(12) United States Patent
Kim et al.

(10) Patent No.: US 12,017,343 B2
(45) Date of Patent: Jun. 25, 2024

(54) TACTILE SENSOR, AND TACTILE STIMULATION SENSING METHOD USING THE SAME, AND ROBOT SKIN AND ROBOT COMPRISING THE SAME

(71) Applicant: Korea Advanced Institute of Science and Technology, Daejeon (KR)

(72) Inventors: Jung Kim, Daejeon (KR); Min Jin Yang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 579 days.

(21) Appl. No.: 17/284,203

(22) PCT Filed: Feb. 26, 2021

(86) PCT No.: PCT/KR2021/002483
§ 371 (c)(1),
(2) Date: Apr. 9, 2021

(87) PCT Pub. No.: WO2022/030715
PCT Pub. Date: Feb. 10, 2022

(65) Prior Publication Data
US 2022/0297309 A1 Sep. 22, 2022

(30) Foreign Application Priority Data

Aug. 4, 2020 (KR) .......... 10-2020-0097497
Feb. 25, 2021 (KR) .......... 10-2021-0025439

(51) Int. Cl.
*B25J 13/08* (2006.01)
*B25J 9/00* (2006.01)
(Continued)

(52) U.S. Cl.
CPC .......... *B25J 13/084* (2013.01); *B25J 9/0009* (2013.01); *B25J 19/026* (2013.01); *G01L 5/171* (2020.01);
(Continued)

(58) Field of Classification Search
CPC ......... G01L 5/171; G01L 5/173; G01L 5/228; B25J 13/084; B25J 9/0009; B25J 19/026
See application file for complete search history.

(56) References Cited

U.S. PATENT DOCUMENTS

2009/0158864 A1\* 6/2009 Hayakawa ............. B25J 13/084
901/1
2012/0242592 A1 9/2012 Rothkopf et al.
(Continued)

FOREIGN PATENT DOCUMENTS

JP 2012141255 A 7/2012
JP 2013175847 A 9/2013
(Continued)

OTHER PUBLICATIONS

Feng, D. et al., "Active prior tactile knowledge transfer for learning tactual properties of new objects," Sensors 2018 (2), 634 (Feb. 21, 2018), 19 pgs.
(Continued)

*Primary Examiner* — Benjamin R Schmitt
(74) *Attorney, Agent, or Firm* — Fredrikson & Byron, P.A.

(57) ABSTRACT

The present invention relates to a tactile sensor, a tactile stimulation sensing method using the same, and a robot skin and a robot comprising the same. Particularly, the present invention relates to a tactile sensor comprising an input layer for receiving an external tactile stimulus; a microphone member; and a medium layer disposed between the input layer and the microphone member, and including gas therein
(Continued)

to transmit vibrations by the stimulus, a tactile stimulation sensing method using the same, and a robot skin and a robot comprising the same.

16 Claims, 30 Drawing Sheets

(51) Int. Cl.
*B25J 19/02* (2006.01)
*G01L 5/171* (2020.01)
*G01L 5/173* (2020.01)
*G01L 5/22* (2006.01)
*G06N 20/00* (2019.01)

(52) U.S. Cl.
CPC .............. *G01L 5/173* (2020.01); *G01L 5/228* (2013.01); *G06N 20/00* (2019.01)

(56) References Cited

U.S. PATENT DOCUMENTS

2020/0064952 A1  2/2020  Gupta et al.
2022/0269348 A1* 8/2022  Yoshida ............... H03K 17/968

FOREIGN PATENT DOCUMENTS

| JP | 2014509028 A | 4/2014 |
| JP | 2019002905 A | 1/2019 |
| JP | 2020510201 A | 4/2020 |
| KR | 100959656 B1 | 5/2010 |
| KR | 1020160117714 A | 10/2016 |
| KR | 1020200020426 A | 2/2020 |

OTHER PUBLICATIONS

Min Jin Yang. (2020), "A large-scaled, soft dynamic tactile sensor with a passive localisation for physical human robot interaction," Abstract, Korea Advanced Institute of Science and Technology, Daejeon, Republic of Korea, Feb. 2020, published on the website of the National Assembly Library of Korea (https://www.nanet.go.kr/main.do), 1 pg.

Min Jin Yang, "A large-scaled, soft dynamic tactile sensor with a passive localisation for physical human robot interaction," Korea Advanced Institute of Science and Technology, Daejeon, Republic of Korea, Feb. 29, 2020, published on the website of the National Assembly Library of Korea (https://www.nanet.go.kr/main.do), 63 pages.

* cited by examiner $$|x - x_1| - |x - x_2| = \tau_{12}$$

FIG. 23

|  | \ | Predicated class | | | | |
|---|---|---|---|---|---|---|
|  |  | No Contact | Pat | Rub | Scratch | Stroke | Tickle |
| Reference class | No Contact | 100 | 0 | 0 | 0 | 0 | 0 |
|  | Pat | 5 | 94 | 0 | 0.3 | 0.7 | 0 |
|  | Rub | 0 | 1.6 | 89.2 | 1.7 | 2.6 | 4.9 |
|  | Scratch | 2 | 2.7 | 0.4 | 85 | 7.7 | 2.2 |
|  | Stroke | 0 | 1 | 8.7 | 24.1 | 66.2 | 0 |
|  | Tickle | 0 | 4.3 | 7.1 | 1.9 | 4.3 | 82.4 |

FIG. 24

|  | Predicated class | | | | | |
|---|---|---|---|---|---|---|
| Reference class | No Contact | Pat | Rub | Scratch | Stroke | Tickle |
| No Contact | 98.3 | 0 | 0 | 0 | 1.7 | 0 |
| Pat | 0.9 | 97.5 | 0 | 0 | 0 | 1.6 |
| Rub | 0.9 | 1 | 85.4 | 1.9 | 1.7 | 9.1 |
| Scratch | 0 | 6.2 | 2.9 | 81.9 | 7.2 | 1.8 |
| Stroke | 0 | 2.2 | 6.6 | 7.8 | 81.6 | 1.8 |
| Tickle | 0 | 0 | 2.3 | 0.9 | 2.6 | 94.2 |

TACTILE SENSOR, AND TACTILE STIMULATION SENSING METHOD USING THE SAME, AND ROBOT SKIN AND ROBOT COMPRISING THE SAME

RELATED APPLICATIONS

This application is a 35 U.S.C. 371 national stage filing from International Application No. PCT/KR2021/002483, filed Feb. 26, 2021, which claims priority to Korean Application No. 10-2021-0025439, filed Feb. 25, 2021, and Korean Application No. 10-2020-0097497, filed Aug. 4, 2020, the teachings of which are incorporated herein by reference.

BACKGROUND OF THE INVENTION

1. Field of the Invention

The present invention relates to a tactile sensor, a tactile stimulation sensing method using the same, and a robot skin and a robot comprising the same.

2. Description of the Related Art

With the development of robot technology, the use of robots is not limited to robots that perform simple repetitive tasks in an independent space, and robots that actively interact with people in the same space as humans are increasing. In order for a robot to interact physically with humans based on tactile sensation, a soft tactile sensor that can measure the tactile information on the whole body of the robot and reduce the risk of collision is required.

Tactile sensors made of soft materials have already been published in many academic. As a related prior art, Korean Patent No. 10-0959656 discloses a skin sensor for robotic applications and sensing method thereof, particularly a skin sensor for robotic applications that is made by attaching a robot skin of a polymer material with flexible properties and comprising a sensor unit in which a first electrode, a film made of a dielectric elastomer, and a second electrode are sequentially stacked to the surface of a robot, and that detects the size and contact site of the external load by using the changes of physical characteristics of the sensor unit that occurs when an external load contacts the robot skin.

However, such a tactile sensor made of a flexible substance has limited disadvantages in extending it to the whole body of a robot in order to actively interact with humans.

In addition, in order to overcome the above disadvantages, Di Feng disclosed a method of extending the sensor to the entire robot body by connecting a large number of sensor modules having a small area in Sensors 2018, 18(2), 634. Such a modular method has an advantage of having high accuracy, but there are many disadvantages such as an increase in manufacturing difficulty, an increase in price, an increase in data amount, requirement of large amount of computational power, and an increase in energy consumption as the number of sensors increases. However, when the robot interacts with humans in the whole body, high accuracy is not required. As in the case of a physical interaction between a person and a person, when someone pats the back, the location or intensity of the patting in the back is not exactly known, but this is interpreted as a sense of encouragement. The technology that makes a large area by expanding a large number of small area tactile sensors for this interaction is not efficient.

The contrary technology is a method of measuring the sense of touch by distributing a small number of sensing nodes on a large area of the robot skin. Since this method inversely estimates tactile information using the data measured by a small number of sensing nodes, the accuracy is relatively low. However, this system is considered an efficient mechanism as a tactile sensor for robot skin due to its low manufacturing difficulty, cost, and low computational volume.

There are mechanical receptors that can detect tactile sense on the human skin, and each mechanical receptor detects a different kind of tactile sense. Likewise, the frequency band of the tactile sense that can measured differs according to the sensing method used to prepare a tactile sensor. Since the piezoresistive method or the capacitive method has a low frequency band, is used to detect a pressing touch corresponding to a static touch. On the other hand, since the piezoelectric method or the sound-based sensing method has a high frequency band, it is used to detect a dynamic tactile sense based on vibration, such as a sense of stroke.

In the tactile sensor using distributed sensing nodes, the tactile sense that can be measured is determined according to the sensing method of the sensing nodes. When the corresponding tactile sense is given at any position on the robot skin, the stimulus by tactile sense must be well transmitted to the distributed sensing nodes to become an accurate tactile sensor. Therefore, the physical properties, boundary conditions, and dimensions of the medium that transmits the tactile stimuli affect the sensor's performance. Based on the information transmitted to the sensing node the medium, a method of tracking back the location and type of tactile sense is being studied. However, more research is needed to apply this to robot skin.

PRIOR ART REFERENCE

Patent Reference

Korean Patent No. 10-0959656

Non-Patent Reference

Di Feng et al, Sensors 2018, 18(2), 634 (2018 Feb. 21)

SUMMARY OF THE INVENTION

It is an object of the invention to provide a tactile sensor.

It is another object of the present invention to provide a tactile stimulation sensing method using the tactile sensor.

To achieve the above objects, in an aspect of the present invention, the present invention provides a tactile sensor comprising an input layer for receiving an external tactile stimulus; a microphone member; and a medium layer disposed between the input layer and the microphone member, and including gas therein to transmit vibrations by the stimulus.

The tactile sensor can further include a supporting member disposed to maintain the volume of the medium layer.

The supporting member can be a mesh construct having a porous structure.

The input layer can have a protrusion formed on one surface to which the external stimulus is applied.

The tactile sensor can further include a substrate, and the microphone member can be disposed on the substrate.

The microphone member can include at least two microphones spaced apart.

The tactile sensor is electrically connected to the microphone member, and can further include a control unit determining at least one of a location to which a tactile stimulus is applied and a type of the tactile stimulus.

The control unit can determine the location of a tactile stimulus by analyzing at least one of the intensity and arrival time of the vibration received by the microphone member, and analyzes the waveform of the vibration received by the microphone member to determine the type of a tactile stimulus.

The tactile sensor can further include an output unit that outputs at least one of the locations of a tactile stimulus and the type of the tactile stimulus determined by the control unit.

The gas in the medium layer can be air.

The tactile stimulus can be at least one selected the group consisting of tapping, robbing, sweeping, scratching, tickling and sapping, and more preferably at least one selected from group consisting of tapping, rubbing, sweeping, scratching and tickling.

In another aspect of the present invention, the present invention provides a tactile stimulation sensing method comprising the following steps:
receiving a tactile stimulus applied from the outside;
generating a vibration of gas from the received tactile stimulus; and
receiving the vibration of the gas by the microphone member.

The tactile stimulation sensing method can further include a step of determining the location of a tactile stimulus by analyzing at least one of the intensity and arrival time of the vibration received by the microphone member after the step of receiving the vibration of the gas by the microphone member.

The tactile stimulation sensing method can further include a step of determining the type of a tactile stimulus by analyzing the waveform of the vibration received by the microphone member after the step of receiving the vibration of the gas by the microphone member.

In another aspect of the present invention, the present invention provides a robot skin comprising the tactile sensor.

At this time, the microphone member of the tactile sensor can be disposed on the robot skin.

In another aspect of the present invention, the present invention provides a robot including the robot skin.

Advantageous Effect

The tactile sensor according to an aspect of the present invention can receive a tactile stimulus in the form of a gas vibration using a microphone member, and can determine at least one of the location and type of the tactile sense by analyzing the vibration of the gas received by the microphone member. In particular, the tactile sensor is more effective in detecting the dynamic tactile senses based on vibrations such as tapping, rubbing, sweeping, scratching, tickling and slapping.

In addition, the tactile sensor according to an aspect of the present invention can detect a tactile sense of a large area through the microphones spaced apart. Therefore, compared to the modular tactile sensor in which the sensor must be disposed over a large area, the tactile sensor of the present invention has the advantage of having low manufacturing difficulty and being able to manufacture at a low price.

Further, the tactile sensor according to an aspect of the present invention can be applied to a robot skin. In particular, the tactile sensor is more effective in classifying the dynamic tactile senses such as capping, and rubbing, sweeping, scratching, tickling and slapping. Therefore, the tactile sensor can be applied to various robots requiring non-verbal communication, such as a pet robot or a nursing robot. The tactile sensor can help modern robots, mainly commercial robots that perform repetitive tasks in an independent space, to develop into robots that collaborate and communicate in the same space aa humans.

In addition, the tactile sensor can also be used to measure the biological signals by attaching the sensor to the body, such as measuring the biological signals on the skin surface of a disabled person with amputated lower limbs and identifying the intent of operation.

BRIEF DESCRIPTION OF THE DRAWINGS

FIG. 23 is a diagram illustrating the accuracy of classification of the tactile stimuli classified by the tactile sensor of Example 5 using a convolutional neural network, and FIG. 24 is a diagram illustrating the accuracy of classification of the tactile stimuli classified by the tactile sensor of Example 6 using a convolutional neural network.

DESCRIPTION OF THE PREFERRED EMBODIMENTS

Figure 1:
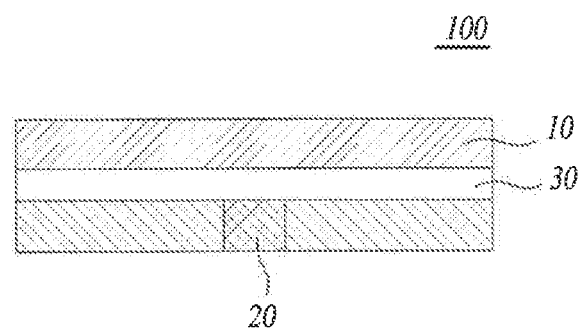
FIG. 1 is a schematic diagram illustrating the tactile sensor according to Example.

Hereinafter, the preferable embodiments of the present invention are described with the attached drawings. However, the embodiments of the present invention can be modified and altered in various ways and the present invention is not limited to the following illustration. It is well understood by those in the art who has the average knowledge on this field that the embodiments of the present invention are given to explain the present invention more precisely. Therefore, the shape and size of the elements in the drawings may be exaggerated for clarity of illustration and the elements indicated by the same mark in the drawings are the same elements. The factors showing similar function or activity are also indicated by the same mark in all the drawings. In addition, the "inclusion" of an element throughout the specification does not exclude other elements, but may include other elements, unless specifically stated otherwise.

In an aspect of the present invention, the present invention provides a tactile sensor comprising an input layer for receiving an external tactile stimulus; a microphone member; and a medium layer disposed between the input layer and the microphone member, and including gas therein to transmit vibrations by the stimulus.

Hereinafter, the tactile sensor according to an aspect of the present, invention is described in detail with reference to the drawings.

FIGS. 1 to 4 are diagrams schematically illustrating the various embodiments of the tactile sensor (100) according co an aspect of the present invention.

FIG. 1 is a schematic diagram illustrating the tactile sensor (100) according to Example 1

As shown in FIG. 1, the tactile sensor (100) includes an input layer (10) for receiving a tactile stimulus applied from the outside.

The input layer (10) is a layer that receives a tactile stimulus applied from the outside, and can include a tactile point at which the tactile stimulus is generated.

The tactile stimulus can be generated in various forms, for example, one or more selected from the group consisting of tapping, rubbing, sweeping, scratching, tickling and slapping, and more preferably one or more selected from the group consisting of tapping, rubbing, sweeping, scratching and tickling.

However, the tactile stimulus is not limited thereto, and can be various other types of tactile stimulus accompanied by vibration.

The input layer (10) is vibrated by the tactile stimulus applied from the outside, and the vibration of the input layer (10) can be transmitted to the medium layer (30).

The input layer (10) can preferably have flexibility so that the tactile sensor (100) can be formed on a surface having various shapes, and more Preferably, can have flexibility, but low dynamic modulus, so that the tactile stimulus is transmitted to the medium layer (30) without being absorbed by the input layer.

Accordingly, the input layer (10) can be made of a polymer material having flexibility, and preferably made of a polymer material having low dynamic modulus.

For example, the input layer (10) can be made of at least one polymer material selected from the group consisting of polydimethylsiloxane (PDMS), neoprene foam, air mesh and foam fabric.

Figure 2:
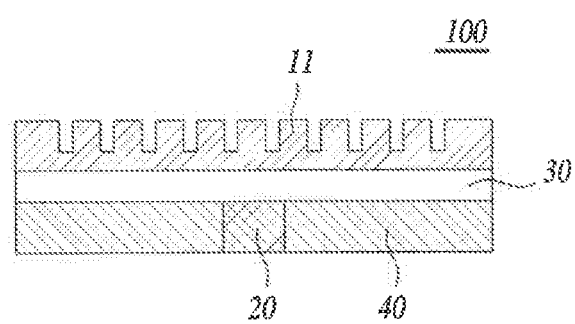
FIG. 2 is a schematic diagram illustrating the tactile sensor according to Example.

One surface of the input layer (10) to which an external tactile stimulus is applied can have a flat shape as shown in FIG. 1, and preferably, a protrusion (11) can be formed on the one surface as shown in FIG. 2.

For example, the input layer (10) can be formed in a form in which a loop fabric is disposed on one side made of one or more polymer materials selected from the group consisting of polydimethylsiloxane (PDMS), neoprene foam, air mesh and foam fabric, and a protrusion (11) is formed on the one side.

As shown in FIG. 2, a plurality of protrusions (11) can be formed on one side of the input (10), and a gap can be formed between the protrusions (11). In the input layer (10), when a tactile sense such as rubbing among tactile stimuli occurs, microscopic vibrations can be additionally generated in gap between the protrusions, so that the tactile stimulus can be more effectively transmitted to the medium layer (30).

The tactile sensor (100) according to an aspect of the present invention includes a medium layer (30) disposed between the input layer (10) and the microphone member (20) and including gas therein to transmit vibrations by the tactile stimulus.

The medium layer (30) can be a layer that transmits the tactile stimulus generated in the input layer (10) to the microphone member (20).

That is, when an external tactile stimulus is applied to the input layer (10), the stimulus is transmitted to the medium layer (30), and the stimulus can be transmitted in the form of vibration by the gas included in the medium layer (30).

The medium layer (30) can physically separate the input layer (10) and the microphone member (20), and can transmit a tactile stimulus applied to the input layer (10) to the microphone member (20) in the form of gas vibration.

Accordingly, the tactile sensor (100) according to an aspect of the present invention can transmit a tactile stimulus generated at an arbitrary point (tactile point) in the input layer (10) having a large area through the medium layer (30) to each of at least two microphones spaced apart. Therefore, the tactile sensor of the present invention may be more effective as a tactile sensor for sensing the tactile sense of an area.

If the tactile sensor (100) does not include the medium layer (30), the input layer (10) and the microphone member (20) come into contact with each other. Thus, it is difficult to detect & tactile stimulus in a region where the input layer and the microphone member (20) are not in contact. That is, when the microphone member (20) is distributedly disposed, it is difficult to detect the tactile stimulus generated at a position where the microphone member (20) is net disposed. In order to detect the tactile stimulus generated throughout the input layer (10), a large number of microphones (20) must be connected continuously.

On the other hand, the tactile sensor (100) according to an aspect of the present invention has advantages of low manufacturing difficulty, price, data amount, computational request capability, and energy consumption, compared to a modular tactile sensor that detects tactile stimuli by connecting a large number of sensor modules continuously or when not including the medium layer (30).

Figure 3:
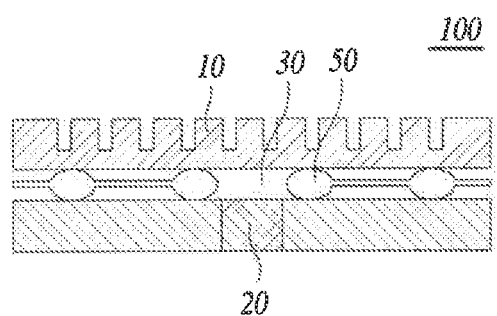
FIG. 3 is a schematic diagram illustrating the tactile sensor according to Example.

The tactile sensor (100) according to an aspect of the present invention can further include a supporting member (50) disposed to maintain the volume of the medium layer (30), as shown in FIG. 3.

The supporting member (50) is a component maintaining the volume of the medium layer (30), and can form a space in which gas can be contained in the medium layer (30), and can prevent the input (10) from contacting the microphone member (20), The supporting member (50) can be formed in various forms capable of forming a space in which gas can be contained in the medium layer (30). It may be preferable that the supporting member (50) is not disposed inside the medium layer (10) in contact with the microphone (20) in order to better transmit vibrations, that is, sound waves, transmitted by the gas contained in the medium layer (30) to the member (20).

In addition, the supporting member (50) can have flexibility and elasticity. Preferably, the supporting member can be made of a material having flexibility, but low dynamic modulus, so that the vibration generated in the medium layer (30) by the tactile stimulus of the input layer (10) is not absorbed and transmitted to the gas. For example, the supporting member (50) can be made of a PVC material.

Figure 5:
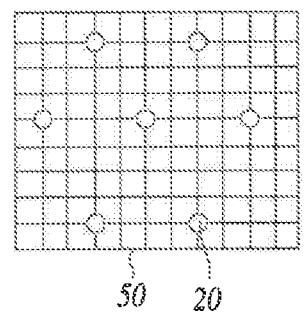
FIG. 5 is a plane view illustrating the plurality of microphones and the supporting members disposed on the plurality of microphones.

FIG. 5 is a plane view illustrating the supporting member (50) in an embodiment of the present invention.

As shown in FIG. 5, the supporting member (50) can be a porous mesh structure. More preferably, the support member can be a structure in which a hole is formed so that the mesh is not disposed at the position where the microphone member (20) is disposed.

The medium layer (30) can contain various gases as gases that transmit vibrations therein, but can preferably contain air.

The medium layer (30) can have an open side surface except for the surface in contact with the input layer (10) and the microphone (20), that is, the upper and lower surfaces. The gas including air can be introduced through the open side surface of the medium layer (30).

The tactile sensor (100) according to an aspect of the present invention includes a microphone member (20).

The input layer (10) of the tactile sensor (100) can receive a tactile stimulus applied from the outside, and the tactile stimulus received by the input layer (10) can be transmitted to the microphone member (20) in the form of gas vibration through the medium layer (30).

The microphone member (20) can include at least two microphones.

Figure 4:
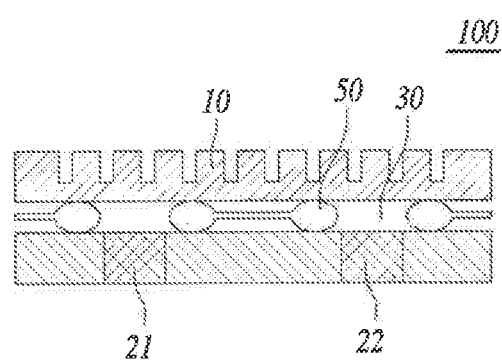
FIG. 4 is a schematic diagram illustrating the tactile sensor according to Example.

For example, the tactile sensor (100) according to an aspect of the present invention can include two microphones (21, 22) spaced apart, as shown in FIG. 4.

The number of microphones included in the tactile sensor (100) may vary according to the area of a location for sensing a tactile stimulus.

In addition, at least two microphones can be spaced 50 mm to 150 mm apart from each other, and can be disposed so that the spacing between adjacent microphones is the same.

Also, at least two microphones can be electrically connected to each other.

Each of the at least two microphones can receive vibrations in frequency bands ranging from 50 Hz to 16 kHz, and preferably, vibrations in frequency bands ranging from 50 Hz to 500 Hz.

Since the microphones can receive the above frequency bands, they can more effectively detect tactile stimuli based on vibrations such as tapping, rubbing, sweeping, scratching, tickling and slapping.

The microphone member (20) can be disposed on the substrate (40).

For example, the microphone member (20) can be fixed on surface of the substrate or can be inserted or embedded in the substrate.

The tactile sensor (100) according to an aspect of the present invention can be used by placing it on the body of various systems, devices, or robots. At this time, the microphone member (20) can be disposed on the body of the system, device or robot, or the microphone member (20) is disposed on the substrate (40), and the substrate (40) can be placed on the body of the system, device or robot.

Meanwhile, the tactile sensor (100) according to an aspect of the present invention can further include a control unit that is electrically connected to the microphone member (20) and determines at least one of a location to which a tactile stimulus is applied and a type of the tactile stimulus.

The control unit can determine any one of a location to which a tactile stimulus is applied and a type of the tactile stimulus, or can determine both a location to which a tactile stimulus is applied and a type of the tactile stimulus.

Figure 7:
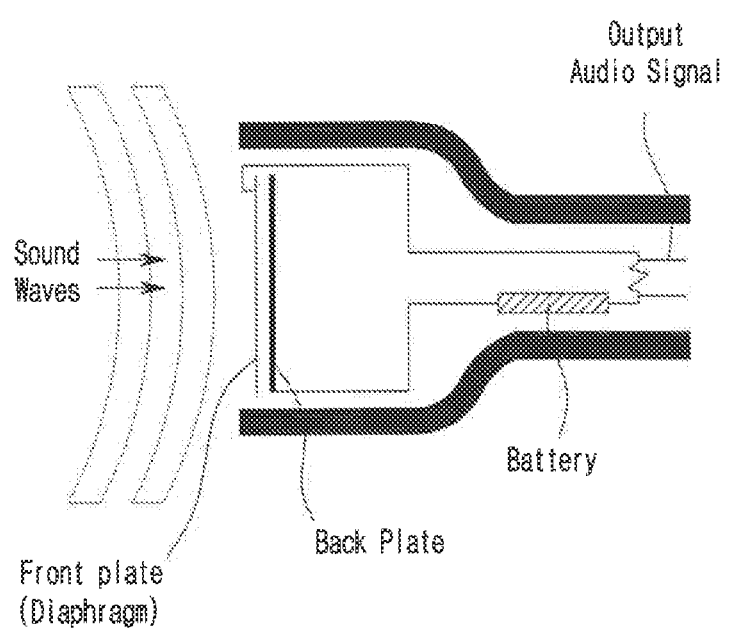
FIG. 7 is a sectional illustrating the microphone according to an embodiment of the present invention.

FIG. 7 is a diagram schematically illustrating the cross section of the microphone member (20) according to an embodiment of the present invention.

As shown in FIG. 7, the microphone member is a transducer that can convert the received vibrations or sound waves of gas into electrical signals, and the control unit can determine a tactile stimulus by receiving the electrical signal converted by the microphone member (20) and analyzing thereof.

The control unit can determine the location of a tactile stimulus by analyzing at least one the intensity of vibration and the arrival time received by the microphone member (20). In more detail, by comparing and analyzing at least one of the intensity of the vibration and the arrival time of the vibration received by each of the at least two microphones, the location to which a tactile stimulus is applied, that is, the tactile point can be output.

Figure 6:
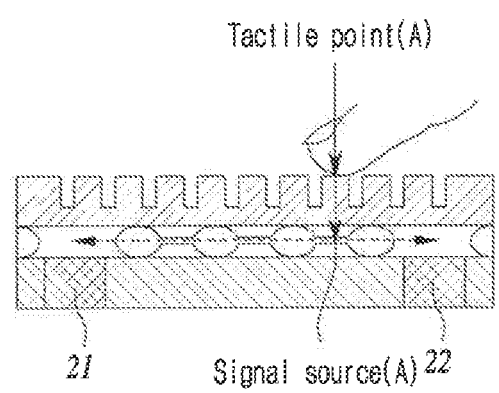
FIG. 6 is a schematic diagram illustrating the method of transmitting a tactile stimulus to a microphone in the tactile sensor according to an aspect of the present invention.

FIG. 6 is a schematic diagram illustrating the method of transmitting the vibrations generated in the medium layer (30) by a tactile stimulus of the input layer (10) to two microphones (21, 22).

As shown in FIG. 6, the distance ($d_1$) between the tactile point (A) and one microphone (21) and the distance ($d_2$) between the tactile point (A) and the other microphone (22) can be different, and the intensity and arrival time of the vibration received by each of the microphones (21, 22) may vary according to the difference between the distances $d_1$ and $d_2$.

Figure 8:
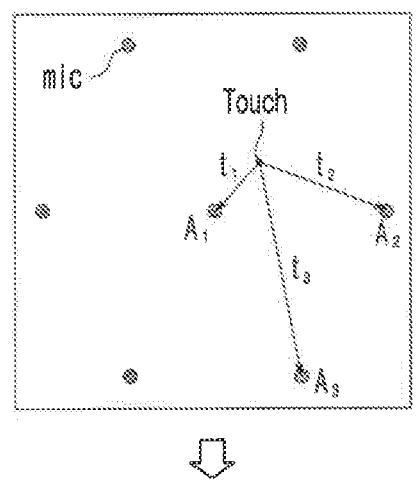
FIG. 8 is a set a diagram and a graph illustrating the intensity and arrival time of the received vibration according to a distance between the microphone and the tactile point in the tactile sensor according to an aspect of the present invention.
Figure 8:
Figure 8:
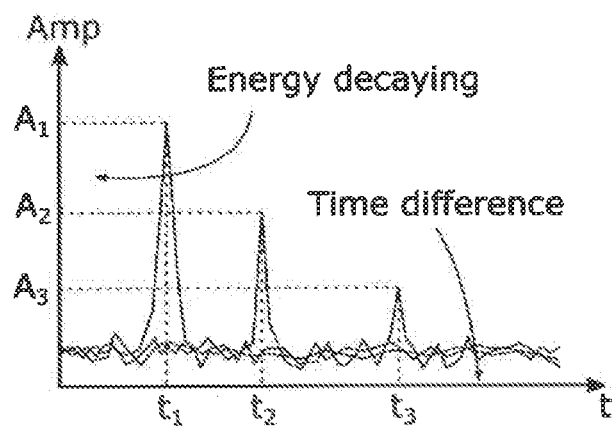

FIG. 8 is a set of a diagram and a graph illustrating the intensity and arrival time of the received vibration according to a distance between the microphone and the tactile point in the tactile sensor according to an aspect of the present invention. As shown in FIG. 8, as a tactile stimulus (touch) is app Led to the input layer (10), the intensity of the vibration received by the microphones ($A_1$, $A_2$, $A_3$) located at different distances from the tactile stimulus is stronger at the microphone located closer to the tactile stimulus than at the microphone located farther from the tactile stimulus, and the arrival time of the vibration is faster at the microphone located closer to the tactile stimulus than at the microphone located farther from the tactile stimulus.

The control unit can determine the location of the tactile point (A) by an energy-based localization method using the intensity of the vibration received by each of the at least two microphones spaced apart.

That is, since the vibrations received by each of the at least two microphones spaced apart have propagated from the same tactile stimulus, they share the same signal source (A'). Therefore, the ratio of the distance from each microphone to the tactile point (A) can be calculated according to the ratio of the intensity of the vibration received from each of the at least two microphones arranged spaced apart, and thus the location of the tactile point (A) that satisfies the ratio can be inversely estimated.

Figure 9:
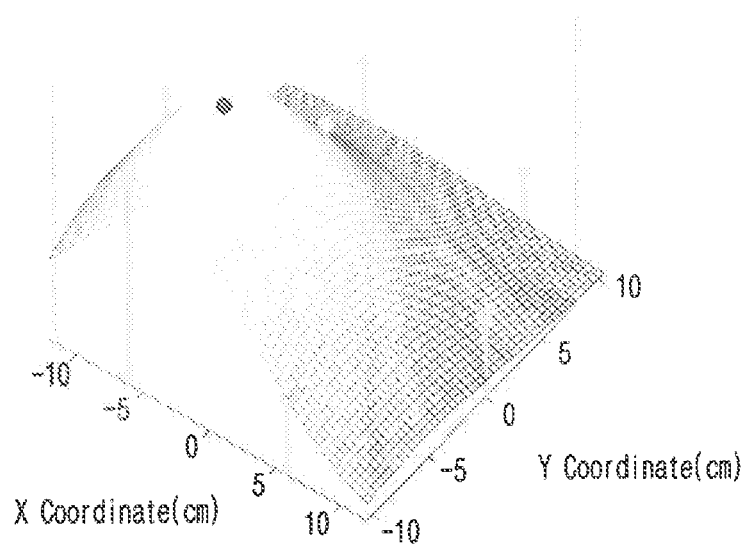
FIG. 9 is a graph illustrating the exemplary relative probability of the position distribution of the tactile senses determined by an energy-based tactile point inverse estimation method by a control unit of the tactile sensor according to an aspect of the present invention.

FIG. 9 is a graph illustrating the exemplary relative probability of the position distribution of the tactile senses determined an energy-based tactile point inverse estimation method by a control unit of the tactile sensor according to an aspect or the present invention.

As shown in FIG. 9, the control unit can inversely estimate the location of the tactile point using the 'Energy decay model' based on equation 1 below. Based on the inversely estimated tactile point, the location of the tactile point at an arbitrary position of the tactile sensor can be expressed as a relative probability graph using Gaussian distribution of equation 2 below.

That is, according to the 'Energy decay model', the tactile point (A) can be inversely estimated by using the following equation 1 as the intensity of vibration ($I_i$) is inversely proportional to the distance between the microphone position ($X_i$) and the signal source (X), The 'Energy decay model' based on equation 1 is established under the ideal assumption that vibrations propagate evenly without loss in all directions in the plane, whereas in reality, the vibrations are absorbed by the input layer and the supporting member as they propagate in space, and noise is included in the measured signal. Therefore, the location of the tactile point estimated inversely by equation 1 may differ greatly from that of the actual tactile point.

Accordingly, the control unit inversely estimates the location of the tactile point using the 'Energy decay model' based on equation 1, and represents the location of the tactile point at an arbitrary position of the tactile sensor as a relative probability as shown in FIG. 9 using Gaussian distribution of equation 2, based on the inversely estimated tactile point. By doing so, it is possible to significantly reduce the error in the location of the measured tactile point with respect to the location of actual tactile point.

$$I_i = g_i \frac{I_0}{r_i} \rightarrow \hat{\imath}_{oi} = \frac{\hat{\imath}_i}{g_i}|x - x_i| \qquad \text{<Equation 1>}$$

$$\varepsilon_j(x) = \hat{\imath}_{oi} - \hat{\imath}_{oj} = \frac{\hat{\imath}_i}{g_i}|x - x_i| - \frac{\hat{\imath}_j}{g_j}|x - x_j|$$

$$x_E = \underset{x}{\arg\min} \sum_{j=2}^{4} \varepsilon_{1j}^2(x) = \underset{x}{\arg\min} \sum \left(\frac{\hat{\imath}_i}{g_i}|x - x_i| - \frac{\hat{\imath}_j}{g_j}|x - x_j|\right)^2$$

$I_i$: The theoretical strength of the vibration signal received by the $i^{th}$ microphone, $I_0$: The intensity of the vibration generated from the signal source, $g_i$: The gain factor of the $i^{th}$ microphone, X: The location of the signal source, $x_i$: The location of the $i^{th}$ microphone, $\hat{\imath}_{oi}$: The strength of the vibration signal at the signal source calculated from the strength of the vibration signal measured at the $i^{th}$ microphone, $\hat{\imath}_{oj}$: The strength of the vibration signal at the signal source calculated from the strength of the vibration signal measured at the $j^{th}$ microphone, $\hat{\imath}_i$: The strength of the vibration signal measured at the $i^{th}$ microphone, $\varepsilon_{ij}(x)$: The difference (error) of the signal source strength calculated at the $i^{th}$ and $j^{th}$ microphones respectively, $x_E$: The location of the tactile point estimated through the 'Energy decay model'.

At this time, the signal source (A') may refer to a point at which a vibration is generated in the medium layer by the tactile stimulus, and may refer to a location on the medium layer corresponding to the tactile point (A).

$$f_E(x) \sim N(x_E, \sigma_E^2) \qquad \text{<Equation 2>}$$

$$f_E(x) = \frac{1}{\sqrt{2\pi\sigma_E}} \exp\left(-\frac{(x - x_E)^2}{\sigma_E^2}\right)$$

$f_E(x)$: Relative probability of presence of tactile points by sensor location according to Gaussian distribution $\sigma_E$: Standard deviation of Gaussian distribution to correct error of the 'Energy decay model'

In addition, the control unit can determine the location of the tactile point by TDOA (time difference of arrival) localization using the difference in arrival time of the vibrations received by each of the at least two microphones, that is, time difference.

Figure 10:
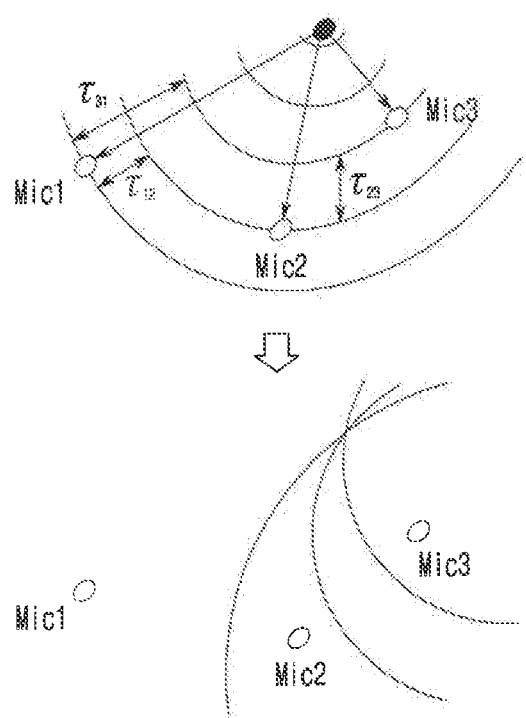
FIG. 10 is an exemplary diagram illustrating the time difference-based tactile point inverse estimation method performed by a control unit of the tactile sensor according a an aspect of the present invention.

FIG. 10 is an exemplary diagram illustrating the TDOA (time difference of arrival) localization performed by a control unit of the tactile sensor according to an aspect of the present invention shown in FIG. 10, the distance difference ($d_{ij}$) between the microphone and the signal source can be calculated by the TDOA (time difference of arrival) localization through the set sampling frequency of the microphone, the propagation speed through the gas, and the location information of the microphone, which can be expressed as equation 3 below.

$$d_{ij}=|x_0-x_i|-|x_0-x_j|=v\cdot\tau_{ij} \qquad \text{<Equation 3>}$$

($x_0$: location of the signal source, $x_i$: location of $i^{th}$ microphone, v: transmission speed of sound wave (constant value), $d_{ij}$: distance between $i^{th}$ and $j^{th}$ microphones, $\tau_{ij}$: TODA between $i^{th}$ and $j^{th}$ microphones)

The TDOA (time difference of arrival) method based on generalized cross correlation phase transform (GCC-PHAT) shows a generalized GCC-PHAT according to the distance difference ($d_{ij}$) between the microphone and the signal source, and then determines the maximum value (peak) among the GCC-PHAT and calculates a time delay of an arbitrary microphone pair (ie, two microphones) from the maximum value (peak).

However, this method has a disadvantage in that an incorrect time difference can be derived because it is vulnerable to sound reflection or noise due to the boundary condition.

Figure 11A:
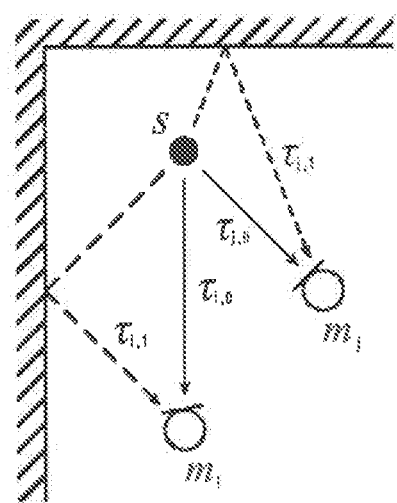
FIGS. 11A to 11C are exemplary diagrams illustrating the disadvantages of the conventional TDOA method using GCC-PHAT.
Figure 11B:
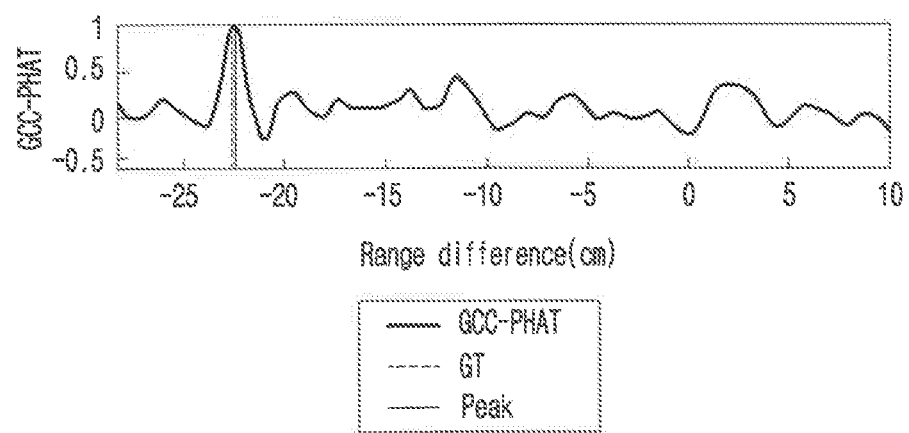
Figure 11C:
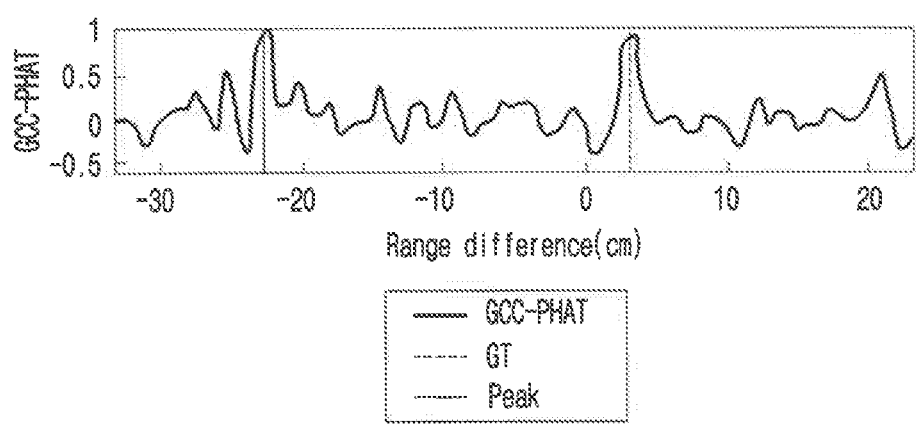

FIGS. 11A to 11C are exemplary diagrams illustrating the disadvantages of the conventional TOGA method using GCC-PHAT. As shown in FIG. 11A, a signal can appear as shown in FIG. 11B by moving from the signal source to the two microphones in a straight line (indicated by a solid line), but as indicated by a dotted line, it can reach the microphone after undergoing one echo depending on the environment. In this case, as shown in FIG. 11C, the maximum value (peak) of GCC-PHAT may occur in other place (L2) than the time difference (L1) by the linear distance, which causes a problem of deriving an incorrect time difference.

Accordingly, in order to prevent the maximum value (peak) of GCC-PHAT from being derived from an incorrect value and to find an accurate time difference, the control unit finds the maximum value (peak) of GCC-PHAT by a TDOA method based on GCC-PHAT. Then, the maximum and minimum values of the time difference are calculated using the following method, and when the position (X-axis value) of the maximum value (peak) of GCC-PHAT is within the range (between the maximum and minimum values of the time difference), the time difference is considered to be a true value. In this way, a more accurate time difference can be derived.

Figure 12:
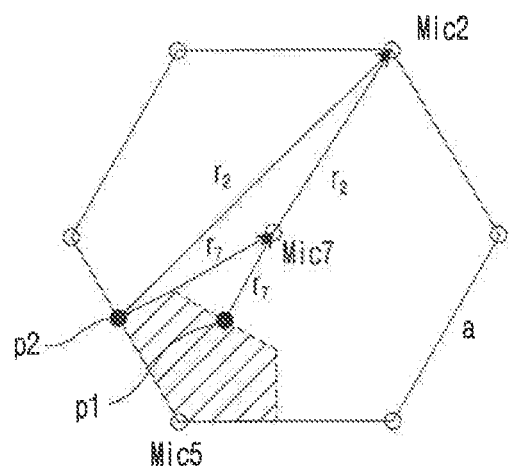
FIG. 12 is an exemplary diagram illustrating the process of calculating the time difference range used in the time difference-based tactile point inverse estimation method performed by a control unit of the tactile sensor according to an aspect of the present invention.
Figure 13:
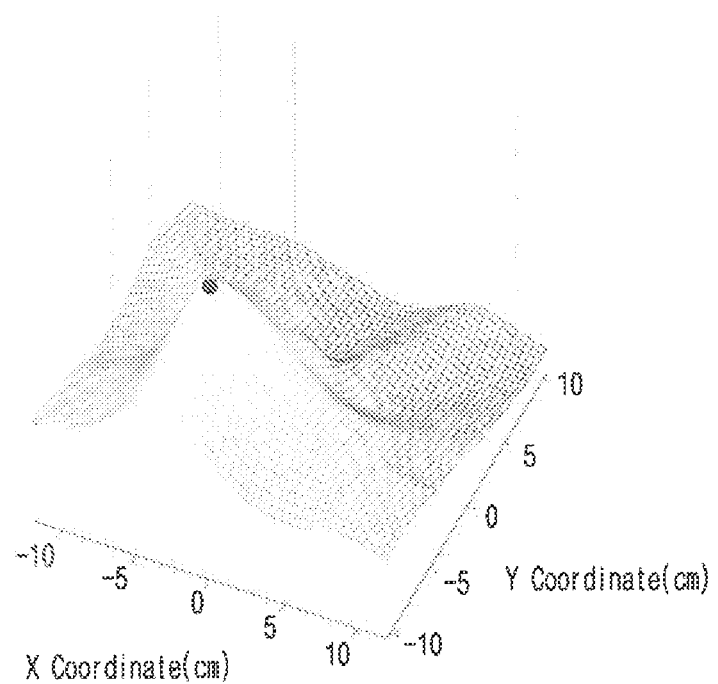
FIG. 13 is a graph illustrating the exemplary relative probability of the tactile position determined based on the time difference-based tactile point inverse estimation method by a control unit of the tactile sensor according art aspect of the present invention.

FIG. 12 is an exemplary diagram illustrating the process of calculating the time difference range used in the TDOA (time difference of arrival) localization method performed by a control unit of the tactile sensor according to an aspect of the present invention, and FIG. 13 is a graph illustrating the exemplary relative probability of the tactile position determined based on the method.

As shown in FIG. 12, for example, if the intensity of the vibration signal measured at microphone 5 (MIC 5) is the strongest, the area where the tactile point can exist (hatched area) is limited, and the time difference that the vibration signal arrives at the microphones 2 and 7 (MIC2, MIC7) within the area can have the maximum and minimum values, respectively, when the tactile point is at the positions indicated by p1 and p2.

The control unit can calculate the maximum value ($\tau_{27M}$) and the minimum value ($\tau_{27m}$) of the time difference between the microphones 2 and 7 (MIC2, MIC7) shown in FIG. 12 as in equation 4 below. In the same way as above, the range of 21 pairs of the time difference values can be calculated when the signal strength is at its maximum in any microphone. Then, when the position (X-axis value) of the maximum value (peak) of GCC-PHAT is within the range (between the maximum and minimum values of the time difference), the time difference is considered to be a true value. In this way, a time difference can be derived.

$$\text{Maximum } TDOA\ \tau_{27M} = \frac{r_2-r_7}{v} = \frac{\frac{3}{2}a\frac{1}{2}a}{v} \qquad \text{<Equation 4>}$$

$$\text{Minimum } TDOA\ \tau_{27m} = \frac{r_2-r_7}{v} = \frac{\frac{\sqrt{13}}{2}a\frac{\sqrt{3}}{2}a}{v}$$

$$\tau_{27m} \le \text{time delay} \le \tau_{27M}$$

Figure 14:
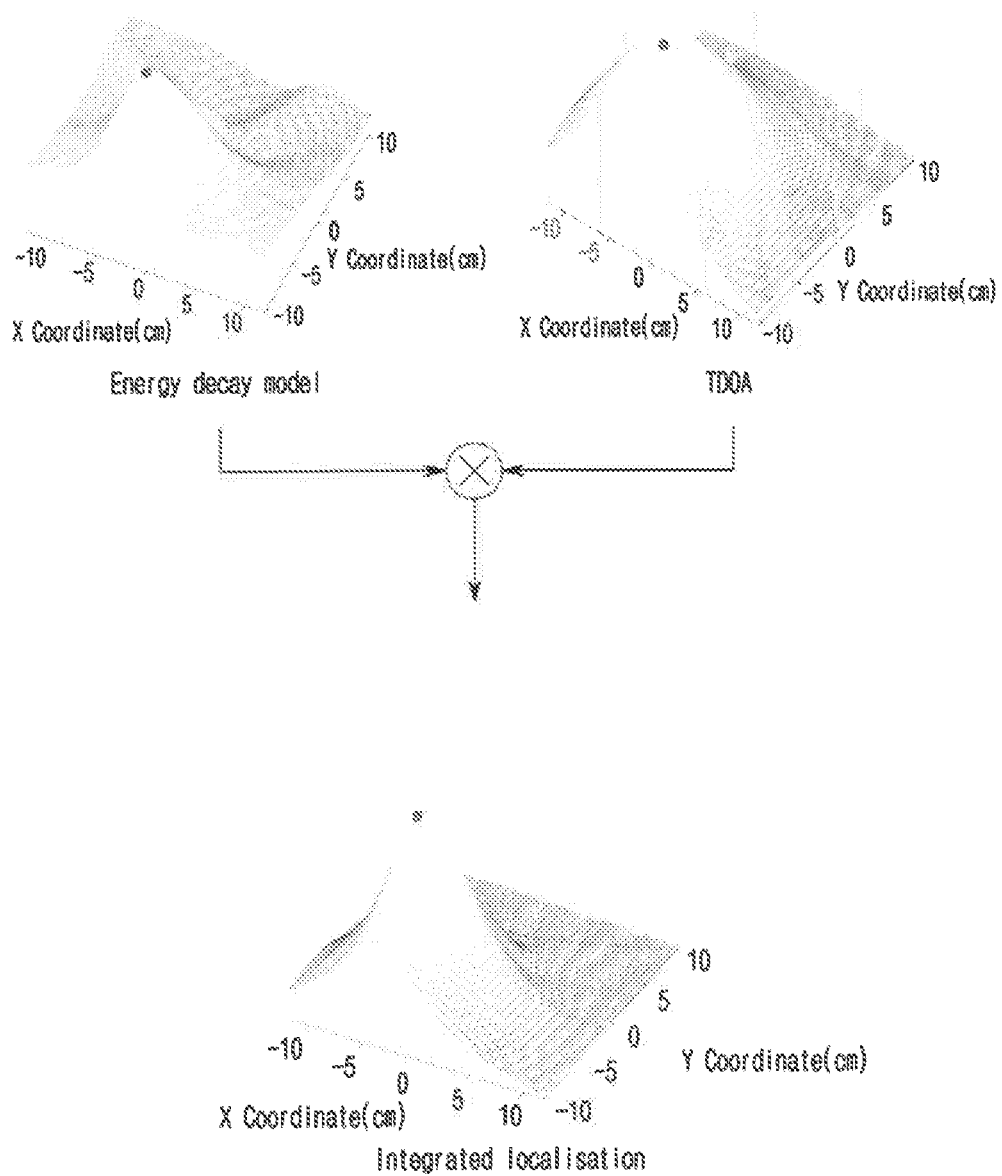
FIG. 14 is an exemplary diagram illustrating the method in which art energy-based tactile point inverse estimation method and a time difference-based tactile point inverse estimation method are integrated among the methods for determining a tactile stimulus by a control unit of the tactile sensor of the present invention.

As shown in FIG. 14, the control unit inversely estimates the tactile point by integrating a method of inverse estimation of a tactile point using the intensity of vibration and a method of inverse estimation of a tactile point using the time difference of vibration, so that the error about the location of the tactile point can be significantly reduced.

Meanwhile, the waveform of the vibration may vary according to the type of a tactile stimulus, and the control unit can determine the type of a tactile stimulus by analyzing the waveform of the vibration received by the microphone member (20).

The waveform of the vibration can be changed according to the type of a tactile stimulus. For example, when tapping lightly, a short vibration signal is measured, but when stroked, a relatively long sound wave signal is measured. The control unit can more accurately classify the type of a tactile stimulus by analyzing the different vibration signals received from the various tactile stimuli through machine learning.

The tactile sensor (100) provided in one aspect of the present invention can further include an output part that outputs at least one of the location of a tactile stimulus determined by the control unit and the type of a tactile stimulus.

The output part can output either the location of a tactile stimulus and the type of a tactile stimulus, or can simultaneously output the location of a tactile stimulus and the type of a tactile stimulus.

In another aspect of the present invention, the present invention provides a tactile stimulation sensing method comprising the following steps:
  receiving a tactile stimulus applied from the outside;
  generating a vibration of gas from the received tactile stimulus; and
  receiving the vibration of the gas by the microphone member.

Hereinafter, the tactile stimulation sensing method according to another aspect of the present invention is described in detail step by step.

First, a step of receiving a tactile stimulus applied from the outside can be performed.

The step can be performed by the input layer of the tactile sensor.

At this time, the tactile stimulus is a tactile stimulus based on vibration, and can be selected from the group consisting of tapping, rubbing, sweeping, scratching, tickling, slapping, stroking and patting.

Next, a step of generating a vibration of gas from the received tactile stimulus can be performed.

The step can be performed by the medium layer of the tactile sensor.

The tactile stimulation sensing method is characterized in that the gas contained in the medium layer of the tactile sensor transmits the tactile stimulus through vibration.

At this time, the gas can be various types of gases capable of transmitting vibrations, preferably air.

Next, a step of receiving the vibration of the gas by the microphone member can be performed.

The tactile stimulation sensing method can be a method of detecting the tactile stimulus by converting the tactile stimulus into vibrations of gas, that is, sound waves, and by configuring the microphone member to receive thereof.

Since the tactile stimulation sensing method detects the tactile stimulus through the vibration of gas, it has the advantage of being able to detect the tactile stimulus for the entire area even if the microphones are not continuously arranged but spaced apart or distributed within the area to detect the tactile stimulus.

The tactile stimulation sensing method can further include a step of determining the location of a tactile stimulus by analyzing at least one of the intensity and arrival time of the vibration received by the microphone member after the step of receiving the vibration of the gas by the microphone member.

The step is a step of determining the location of a tactile stimulus wherein the location of a tactile stimulus can be determined by comparing and analyzing at least one of the intensity and the arrival time of the gas vibration received by the microphone member, more specifically, each of the at least two microphones, preferably by comparing and analyzing both the intensity and the arrival time of the gas vibration.

The tactile stimulation sensing method can further include a step of determining the type of a tactile stimulus by analyzing the waveform of the vibration received by the microphone member.

The step can be performed through machine learning, and the tactile stimulus selected from the group consisting of tapping, rubbing, sweeping, scratching, tickling and slapping can be discerned.

In addition, the tactile stimulation sensing method can further include a step of outputting at least one of the determined location and the type of a tactile stimulus.

The sensing method of the tactile sensor is a method of sensing a tactile stimulus through the vibration of gas, and microphones, which are transducers, can be distributedly arranged in the tactile sensor. Therefore, the tactile sensor of the present invention has advantages of low manufacturing difficulty, price, data amount, computational request capability, and energy consumption, compared to a modular tactile sensor that detects tactile stimuli by connecting a large number of sensor modules continuously.

In another aspect of the present invention, the present invention provides a robot skin comprising the tactile sensor.

Since the robot skin comprises the tactile sensor, it is possible to effectively detect the location of a tactile stimulus applied from the outside and the type of a tactile stimulus.

The tactile sensor comprises an input layer for receiving an external tactile stimulus; a microphone member; and a medium layer disposed between the input layer and the microphone member, and including gas therein to transmit vibrations by the stimulus, and can include all ne features of the tactile sensor described above.

At this time, the microphone member of the tactile sensor can be disposed on the surface of the robot body, or can be inserted or embedded in the robot body.

In addition, the microphone member of the tactile sensor can be disposed on the surface of a substrate, or can be inserted or embedded in the substrate. The substrate can be disposed on the robot body.

The robot skin can include a tactile sensor that transmits the tactile stimulus applied from the outside to at least two microphones spaced apart in the robot skin in the form of gas vibration through the medium layer.

In this case, the number of microphones included in the tactile sensor may vary depending on the area in which the tactile sensor is disposed, and the microphones are preferably arranged so that the distance to the adjacent microphone is 50 mm to 150 mm.

In another aspect of the present invention, the present invention provides a robot including the robot skin.

Since the robot includes the robot skin, it is possible to sense a tactile stimulus generated on the entire surface of the robot skin.

The robot can be a robot such as a pet robot or a nursing robot that requires non-verbal communication, but not always limited thereto.

Hereinafter, the present invention will be described in detail by the following examples and experimental examples.

However, the following examples and experimental examples are only for illustrating the present invention, and the contents of the present invention are not limited thereto.

Example 1

Figure 15:
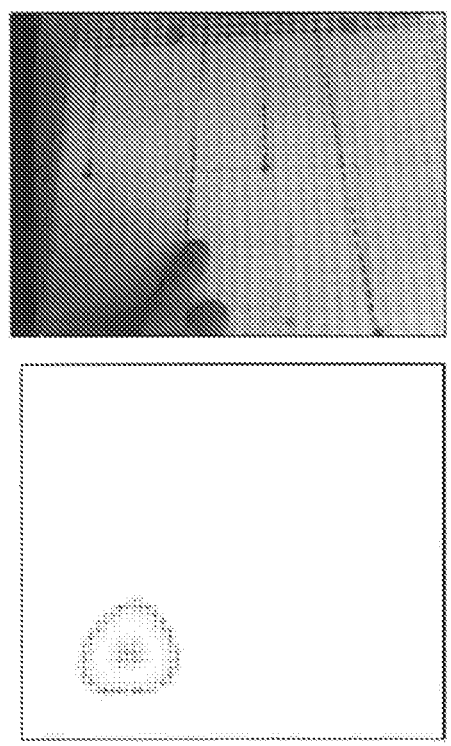
FIG. 15 is a set of diagrams illustrating the results of performing a tactile stimulus detection experiment using the tactile sensor according to Example 1.

A tactile sensor was formed by inserting 7 microphones into an acryl substrate as shown in FIG. 15, and sequentially placing a porous mesh and PDMS having a plurality of protrusions formed on one surface thereof on the substrate (see FIG. 15).

At this time, each of the microphones was connected to the control unit, and the location of the tactile point determined by the control unit was set to be output on a display.

The control unit inversely estimated the tactile point by integrating the tactile point inverse estimation method using the vibration intensity as shown in FIG. 9 and the tactile point inverse estimation method using the time difference as shown in FIG. 13, as shown in FIG. 14.

Example 2

A tactile sensor was formed in the same form as in Example 1, but the control unit was changed to inversely estimate the location of the tactile point by using the tactile point inverse estimation method using the vibration intensity as shown in FIG. 9.

Example 3

A tactile sensor was formed in the same form as in Example 1, but the control unit was changed to inversely estimate the location of the tactile point by using the tactile point inverse estimation method using the time difference as shown in FIG. 13.

Example 4

Figure 16:
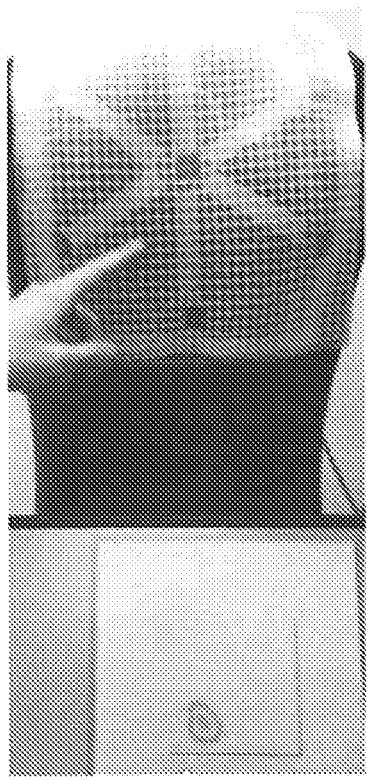
FIG. 16 is a set of diagrams illustrating the results of performing a tactile stimulus detection experiment using the tactile sensor according to Example 4.

A tactile sensor was formed by fixing 7 microphones on the human back model having curvature and elasticity as shewn in FIG. 16, and sequentially placing a porous mesh and PDMS having a plurality of protrusions formed on one surface thereof (see FIG. 16).

At this time, each of the 7 microphones was connected to the control unit that determines the location and type of the tactile point by integrating the 'Energy decay model' and 'TDOA' methods, and the location of the tactile point determined by the control unit was set to be output on a display.

Example 5

Figure 18A:
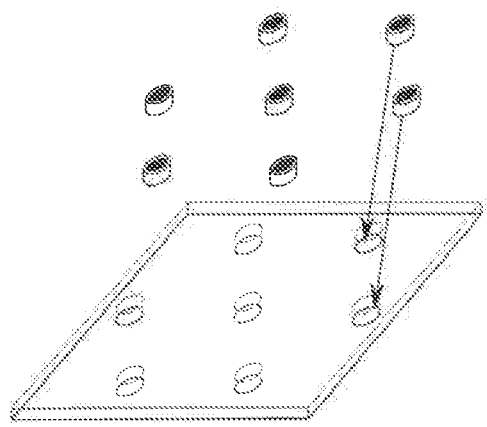
FIGS. 18A to 18C are diagrams schematically illustrating the process of manufacturing the tactile sensor of Example 5.

(Structure of Tactile Sensor)
Seven microphones were inserted into an acryl substrate as shown in FIG. 18A. Particularly, six microphones were placed at the vertices of a cube with a side length of 12 cm, and one microphone was placed in the center of the cube. At this time, CMEJ-4622-25-L082 (CUI Devices, USA) having a diameter of 4.6 mm and a height of 2.2 mm was used as the microphone.

Figure 18B:
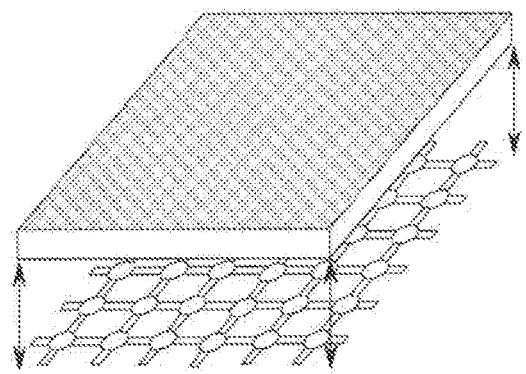
Figure 18C:
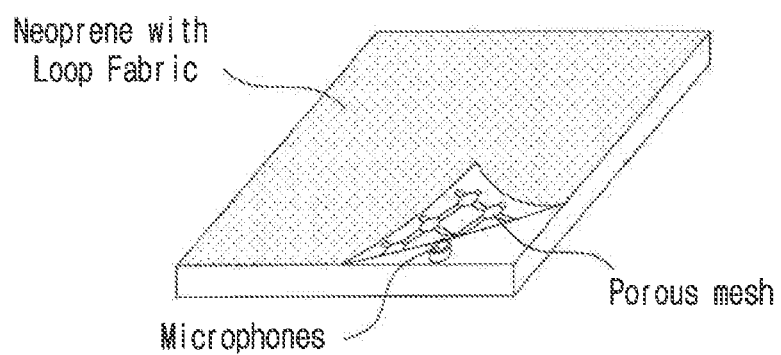

Thereafter, a porous mesh was adhered to the acryl substrate of FIG. 18A on which the microphone was disposed using a spray adhesive, and neoprene having loop fabric formed on one side thereof was adhered (see FIGS. 18B and 18C). At this time, each of the mesh, loop fabric, and neoprene was formed in a square shape with a side length of 265 mm. The adhered loop fabric-neoprene-porous mesh had a total thickness of 6 mm and a total weight of 0.1 g/cm².

Figure 19:
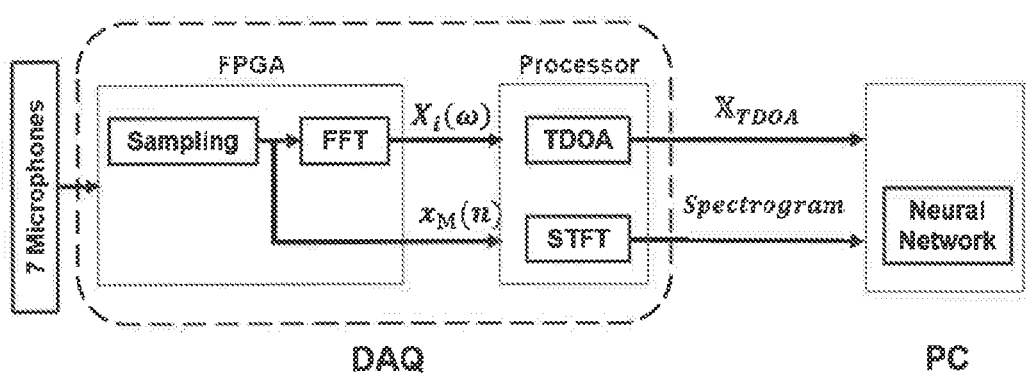
FIG. 19 is a diagram schematically illustrating the processing process using an artificial intelligence network to distinguish the types of tactile stimuli in a controller in Examples 5 and 6.

(Data Processing)
Each of the 7 microphones was connected to the control unit, and the location of the tactile point determined by the control unit was set to be output on a display. At this time, the control unit processed the tactile information in the following manner (see FIG. 19, In FIG. 19, $X_1$ represents the frequency signal of the $i^{th}$ microphone, and $X_M$ represents the raw signal of the microphone showing the maximum value).

Each of the 7 microphones was connected to a single DAQ (myRIO-1900, National Instruments, USA) with an FPGA chip processor chip, whereby each microphone was sampled at a 50 kHz sampling rate and stored in a buffer until 128 samples were collected. The 128-length Hanning window and Fast Fourier Transform (FFT) were performed on the FPGA chip for high-seed computation. Time information and frequency information of the sound waves caused by the tactile were further processed by the myRIO processor.

Example 6

A tactile sensor was formed in the same manner as described in Example 5, except that it was formed on a human back model having curvature and elasticity instead of an acrylic substrate in Example 5.

Experimental Example 1

After applying a tactile stimulus to an arbitrary location on the input layer of the tactile sensor prepared in Examples 1 and 4, the results output from the display are shown in FIGS. 15 and 16.

As shown in FIGS. 15 and 16, the tactile sensor of the present invention could effectively detect the tactile stimulus through the distributed microphones.

Experimental Example 2

In order to confirm the tactile stimulus sensing performance of the tactile sensor of the present invention, the following experiments were performed on the tactile sensors prepared in Examples 1 to 3.

Figure 17A:
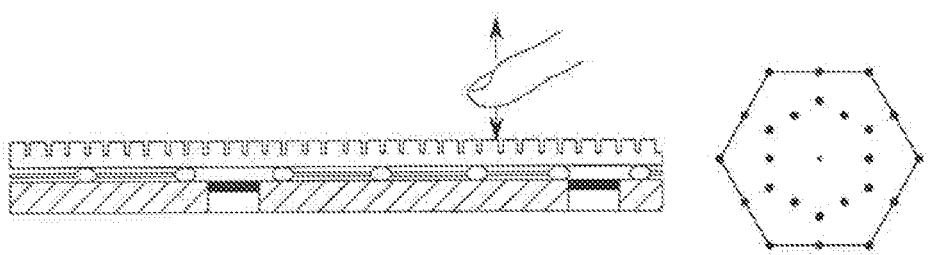
FIGS. 17A to 17C are diagrams illustrating the true value location/path given a specific tactile sense in order to perform a tactile stimulus detection experiment using the tactile sensors according to Examples 1 to 3 of the present invention.

First, for the tactile sensors of Examples 1 to 3, tapping was performed 50 times on each of the 24 points shown in FIG. 17A.

The detection error and standard deviation were calculated by comparing the 1200 data generated by the tactile stimulus with the actual position values (true values) of the 24 points, and the results are shown in Table 1 below.

TABLE 1

|  | Example 1 | Example 2 | Example 3 |
| --- | --- | --- | --- |
| Detection error of tactile stimulus location | 1.152 | 0.793 | 1.628 |
| Standard deviation | 0.585 | 0.253 | 1.097 |

Figure 17B:
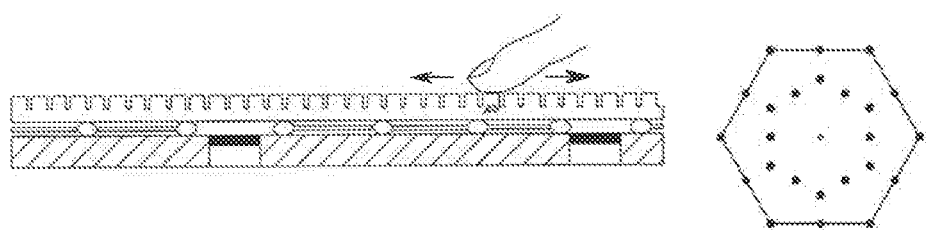

As shown in Table 1, in the case of tapping, the tactile sensor of Example 2 had the least detection error for the tactile stimulus. In addition, for the tactile sensors of Examples 1 to 3, rubbing was performed 50 times on each of the 24 points shown in FIG. 17B.

The detection error and standard deviation were calculated by comparing the 1200 data generated by the tactile stimulus with the actual position values (true values) of the 24 points, and the results are shown in Table 2 below.

TABLE 2

|  | Example 1 | Example 2 | Example 3 |
| --- | --- | --- | --- |
| Detection error of tactile stimulus location | 1.421 | 1.628 | 1.632 |
| Standard deviation | 0.965 | 1.126 | 1.191 |

Figure 17C:
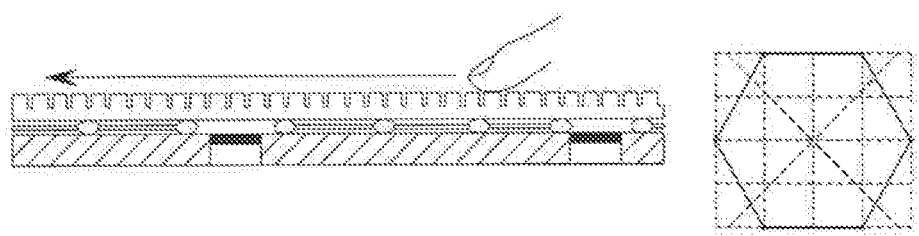

As shown in Table 2, in the case of rubbing, the tactile sensor of Example 1 and the least detection error for the tactile stimulus. In addition, for the tactile sensors of Examples 1 to 3, sweeping was performed 50 times on each of the 12 paths shown in FIG. 17C.

The detection error and standard deviation were calculated by comparing the 600 data generated by the tactile stimulus with the actual paths (true values) of the 12 paths, and the results are shown in Table 3 below.

TABLE 3

|  | Example 1 | Example 2 | Example 3 |
| --- | --- | --- | --- |
| Detection error of tactile stimulus location | 1.546 | 2.157 | 1.410 |
| Standard deviation | 1.610 | 1.900 | 1.579 |

As shown in Table 3, in the case of sweeping, the tactile sensor of Example 3 had the least detection error for the tactile stimulus. In addition, the detection error and standard deviation were calculated for all of the data (3000) used in Tables 1 to 3, and the results are shown in Table 4 below.

TABLE 4

|  | Example 1 | Example 2 | Example 3 |
| --- | --- | --- | --- |
| Average detection error of tactile stimulus location | 1.373 | 1.526 | 1.557 |
| Average standard deviation | 1.053 | 1.093 | 1.289 |

As shown in Table 4, for the entire tactile senses of tapping, rubbing and sweeping, the tactile sensor of Example 1 had the least detection error. From the above results, it was confirmed that the tactile sensor could detect the tactile stimuli of tapping, rubbing and sweeping. It was also confirmed that the location of the tactile point could be derived with less error when inversely estimating the location of the tactile point by integrating the method of inversely estimating the tactile point using the vibration intensity and the method of inversely estimating the tactile point using the time difference, compared to the method of inversely estimating the location of the tactile point using any one of the above methods.

Experimental Example 3

(1) Classification of Tactile Stimuli Using Spectrogram

Figure 20:
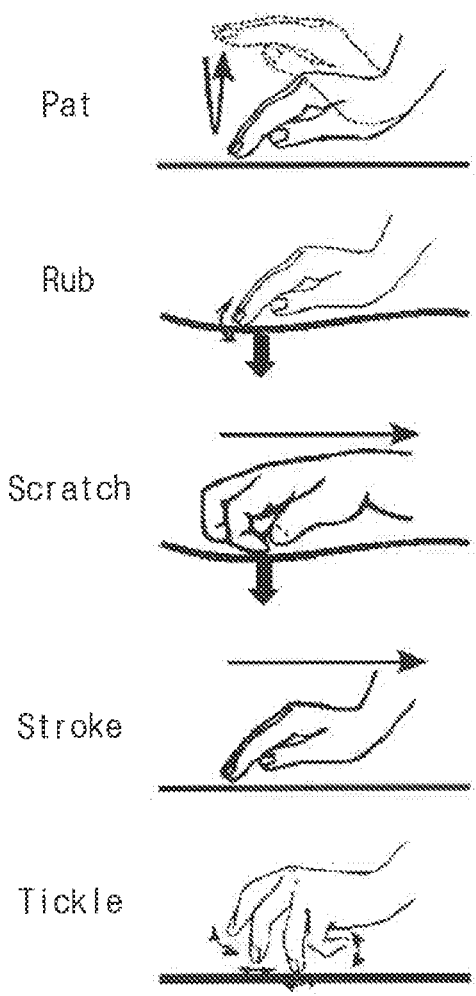
FIG. 20 is a set of diagrams illustrating the types of tactile stimuli input in Experimental Example 3.
Figure 21:
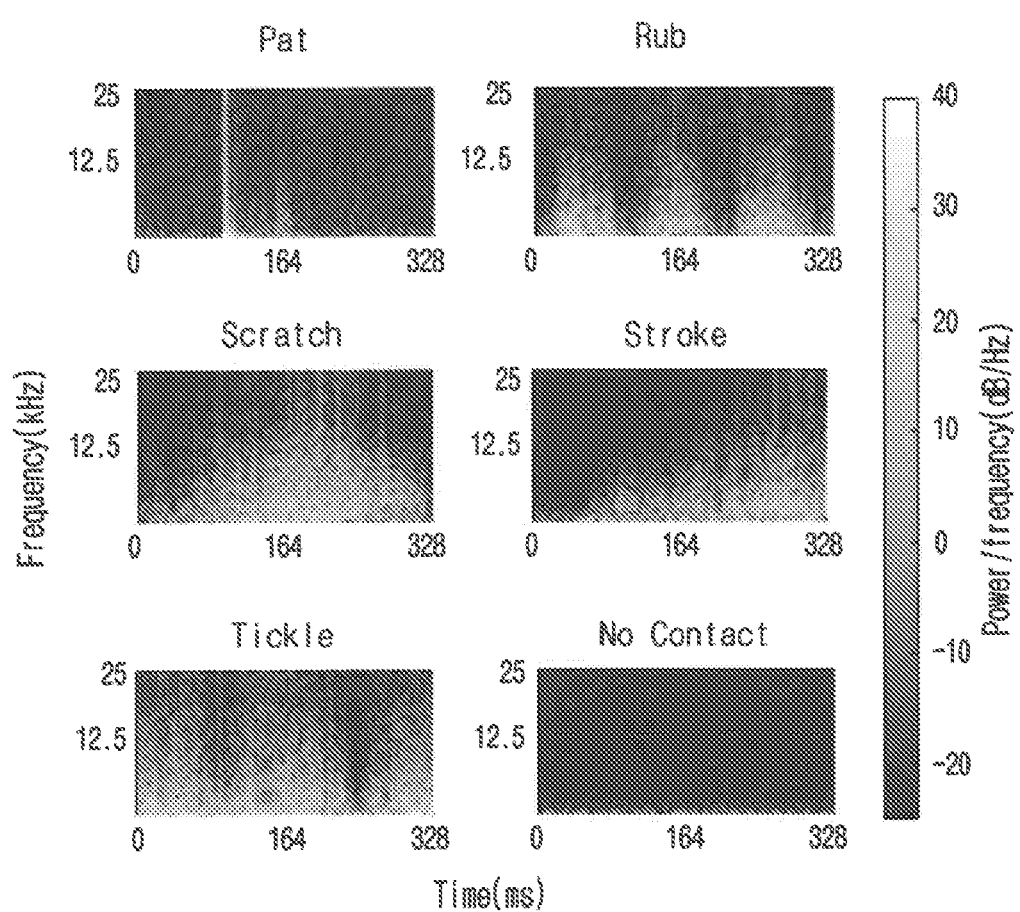
FIG. 21 is a set of spectrograms obtained by using the tactile sensor of Examples 5 and 6 in the presence and absence of the stimuli of FIG. 20.

In order to confirm the tactile stimulus classification performance of the tactile sensor of the present invention, 5 tactile stimuli shown in Table 5 and FIG. 20 were applied to the tactile sensor prepared in Example 5, and the time information of signals having different patterns according to the type of tactile stimulus was visualized by calculating spectrogram, and the results are shown in FIG. 21.

At this time, the spectrogram was calculated every $2^{14}$ samples corresponding to about 328 milliseconds by sliding the Hanning window to the lengths and steps of 128. Fast Fourier transform (FFT) of the same size was performed on each window and expressed in decibel scale. The resulting spectrogram size was 64×129×1, which is the same as the grayscale rectangular image.

TABLE 5

| Tactile stimulus | Explanation |
|---|---|
| Tapping | Gentle and quick contact with the flat of the hand (also referred to as patting) |
| Rubbing | Repetitive move of the upper fingers with a firm pressure |
| Scratching | Fast tangential move of the fingernails across the surface with a pressure |
| Sweeping | Gentle tangential move of the upper fingers across the skin (also referred to as stroking) |
| Tickling | Repetitive and independent light move of the fingertips on the skin |

As shown in FIG. 21, the five tactile stimuli appeared as different spectrograms due to the difference in time information. For example, in the spectrograms, tapping was indicated by short signals, while the tangential movement of scratching and sweeping was indicated by long signals. In addition, repetitive movements rubbing and tickling were indicated by vibration signals in the spectrograms, but tickling appeared more irregularly due to independent movements of the fingers.

From the above results, it was confirmed that the tactile stimuli can be classified and displayed as spectrograms or grayscale images.

(2) Classification of Tactile Stimuli Using Neural Network

Patting and scratching can be easily distinguished through the spectrogram, whereas scratching and stroking may be difficult to distinguish. Accordingly, in order to more accurately classify the tactile stimuli, the following methods were processed with the tactile stimuli received by each of the tactile sensors of Examples 5 and 6 using convolutional neural network. The classification accuracy of the tactile stimuli classified by the artificial neural network was calculated and the results are shown in FIGS. 23 and 24.

Figure 22:
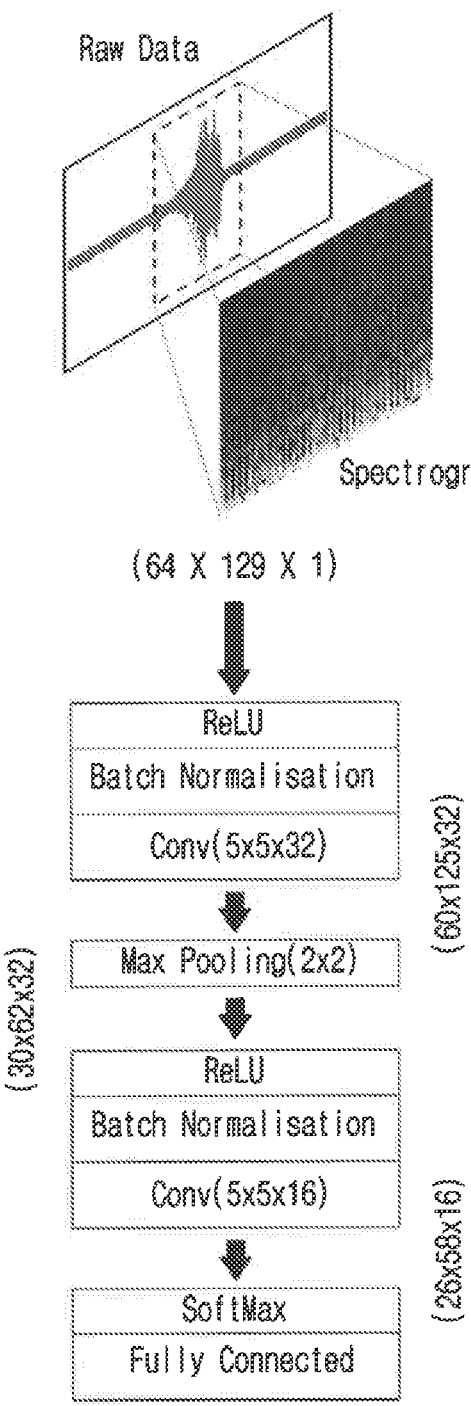
FIG. 22 is a diagram schematically illustrating the algorithm for classifying the types of tactile stimuli through an artificial neural network.

FIG. 22 is a diagram schematically illustrating the algorithm for classifying the types of tactile stimuli through an artificial neural network.

As shown in FIG. 22, an artificial neural network having two convolutional layers with grayscale images as input values was used. The two convolutional layers had a kernel size of 5 and a stride of 1 without padding. The number of kernels in each layer was 32 and 16, and then batch normalization and ReLU (rectified linear unit) activation for both layers were performed. To reduce the size, a max-pooling layer with a size and stride of 2 was placed before the second convolutional layer. A dropout layer with a drop rate of 0.5 was added to the end of the convolutional layer to reduce overfitting. Then, a fully-connected layer with 6 (5 stimuli and no tactile stimulus), which is the number of classifications in which the spectrogram is classified, was added. By applying the softmax function to the result of the fully-connected layer, the probability of the spectrogram in each classification was calculated.

Data sets for training and evaluating the network were collected in the following manner.

Twelve individuals were allowed to apply the tactile stimuli of Table 5 to the sensor, and 100 spectrograms for each tactile stimulus were collected from each individual to generate 6000 data. 1200 spectrograms of baseline noise without contact were added to the data set. The baseline spectrogram was further processed to calculate the mean and standard deviation for the noise of each frequency component. This information about baseline noise was used to generate random noise spectrograms. A total of 72000 data sets were divided into three subsets. A training set was composed of the data of 10 participants, and the other 2 data sets were used as a validation set and a test set. The data sets were partitioned in a way to minimize overfitting for specific individuals. The network was trained with a training set using an ADAM (adaptive moment estimation) optimizer with an initial learning rate of 0.0001, which decreases by 0.5 times every 5 generations. The mini-batch size was set to 256. The validity check loss was calculated every 50 iterations to prevent overfitting, and training was stopped when the validity check loss reached 15, which was more than the previous smallest loss. The training continued until the $50^{th}$ generation, unless stopped due to the validity check loss. The training was conducted in MATLAB (Mass Works, USA) using a single GeForce GTX 1060 3GB GPU (NVIDIA, USA).

FIG. 23 shows the results of processing using the tactile sensor of Example 5, and FIG. 24 shows the results of processing using the tactile sensor of Example 6.

As shown in FIGS. 23 and 24, the tactile sensors of Examples 3 and 6 had the excellent tactile type classification accuracy of 86.1% and 89.8%, respectively. In addition, the tactile sense with the lowest accuracy was sweeping, which was incorrectly classified as scratching, and the two tactile stimuli had very similar spatiotemporal characteristics, so the classification may be more difficult. However, it can be expected that the accuracy can be further improved by configuring the artificial neural network in more depth.

What is claimed is:

1. A tactile sensor comprising an input layer for receiving an external tactile stimulus;
    a microphone member that receives vibrations generated by the external tactile stimulus;
    a medium layer disposed between the input layer and the microphone member, and including gas therein to transmit vibrations by the stimulus to the microphone; and
    a mesh construct having a porous structure disposed within the medium layer as a support member for maintaining the volume of the medium layer.

2. The tactile sensor according to claim 1, wherein the input layer has a plurality of protrusions formed on one surface to which the external stimulus is applied.

3. The tactile sensor according to claim 1, wherein the tactile sensor further includes a substrate, and the microphone member is disposed on the substrate.

4. The tactile sensor according to claim 1, wherein the microphone member includes at least two microphones spaced apart.

5. The tactile sensor according to claim 1, wherein the tactile sensor is electrically connected to the microphone member, and further includes a control unit for determining at least one of a location to which a tactile stimulus is applied and a type of the tactile stimulus.

6. The tactile sensor according to claim 5, wherein the control unit determines the location of a tactile stimulus by analyzing at least one of the intensity and arrival time of the vibration received by the microphone member.

7. The tactile sensor according to claim 5, wherein the control unit determines the type of a tactile stimulus by analyzing the waveform of the sound wave received by the microphone member through machine learning.

8. The tactile sensor according to claim 5, wherein the tactile sensor further includes an output unit that outputs at least one of the location of a tactile stimulus and the type of the tactile stimulus determined by the control unit.

9. The tactile sensor according to claim 1, wherein the gas in the medium layer is air.

10. The tactile sensor according to claim 1, wherein the tactile stimulus is at least one selected from the group consisting of tapping, rubbing, sweeping, scratching and tickling.

11. A tactile stimulation sensing method using the tactile sensor of claim 1, which comprises the following steps:
receiving a tactile stimulus applied from the outside;
generating a vibration of gas from the received tactile stimulus; and
receiving the vibration of the gas by the microphone member.

12. The tactile stimulation sensing method according to claim 11, wherein the microphone member includes at least two microphones spaced apart.

13. The tactile stimulation sensing method according to claim 11, wherein the method further includes a step of determining a location of a tactile stimulus by analyzing at least one of the intensity and arrival time of the vibration received by the microphone member after the step of receiving the vibration of the gas by the microphone member.

14. The tactile stimulation sensing method according to claim 11, wherein the method further includes a step of determining a type of a tactile stimulus by analyzing the waveform of the vibration received by the microphone member after the step of receiving the vibration of the gas by the microphone member.

15. The tactile stimulation sensing method according to claim 11, wherein the microphone member of the tactile sensor is disposed on a robot skin.

16. A robot skin comprising the tactile sensor of claim 1.

* * * * *